United States Patent [19]

Bhimji

[11] 4,187,727
[45] Feb. 12, 1980

[54] FOOD EXTRUDER PRESSURE INDICATOR

[75] Inventor: Amir A. Bhimji, Park Forest South, Ill.

[73] Assignee: General Foods Corporation, White Plains, N.Y.

[21] Appl. No.: 943,843

[22] Filed: Sep. 19, 1978

[51] Int. Cl.² .............................................. G01L 7/00
[52] U.S. Cl. ........................................ 73/706; 73/714
[58] Field of Search ................. 73/714, 701, 155, 302, 73/706

[56] References Cited
U.S. PATENT DOCUMENTS 3,246,522  4/1966  Rapson .................................. 73/701

Primary Examiner—Donald O. Woodiel
Attorney, Agent, or Firm—Mitchell E. Alter; D. J. Donovan

[57] ABSTRACT

Disclosed is a device for sensing and indicating the pressure within a food extruder. Preferably, means are provided to supply a controlled flow of fluid to the interior of the food extruder at a pressure just above that needed to balance the process pressure and sufficient to provide a low positive flow of fluid into the extruder. Means are provided to sense the pressure of the supplied fluid and to indicate its value. By proper calibration of the fluid pressure indicator, the internal extruder pressure can be measured indirectly.

1 Claim, 1 Drawing Figure

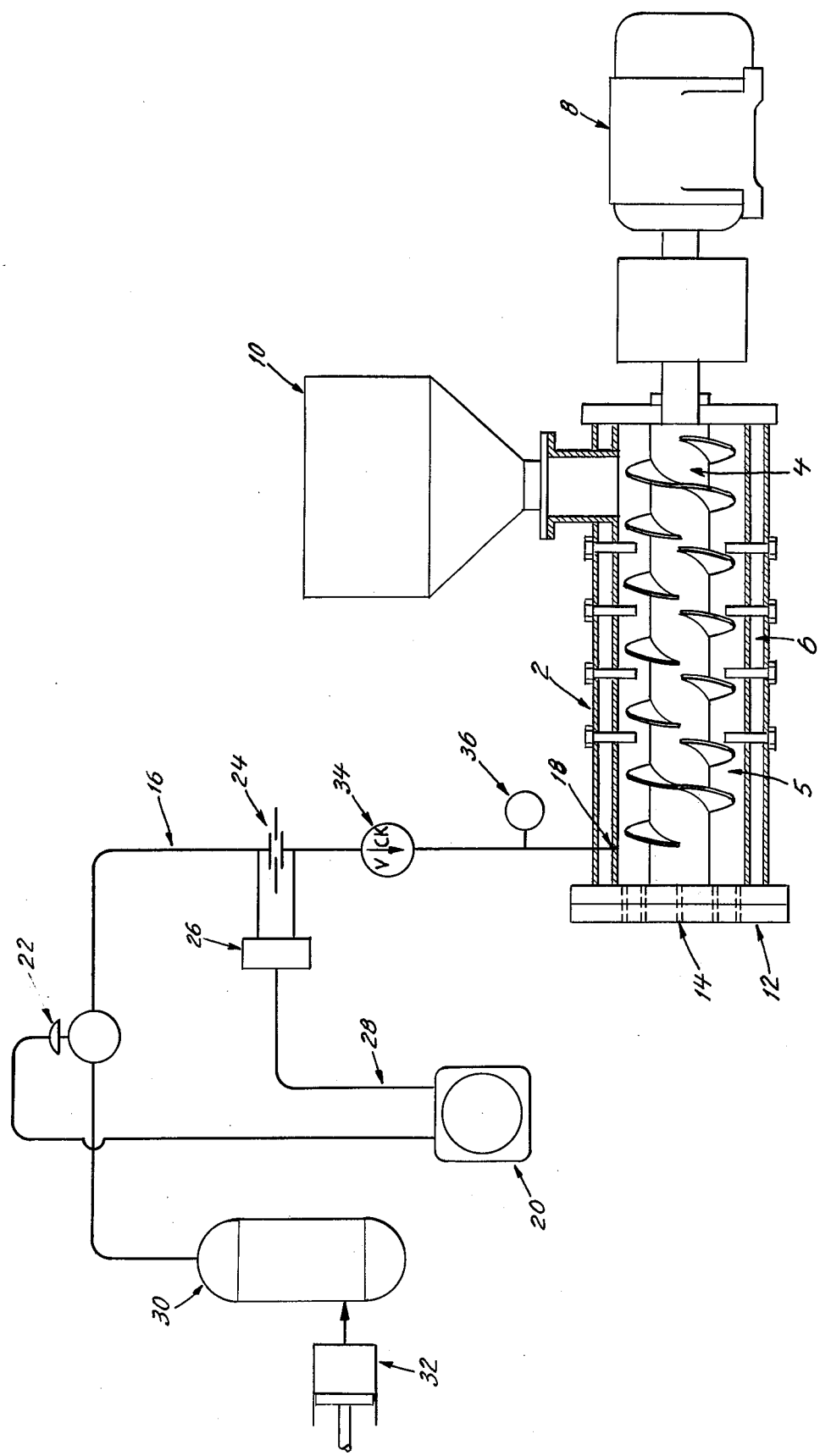

FOOD EXTRUDER PRESSURE INDICATOR

BACKGROUND OF THE INVENTION

The present invention relates to the field of food extrusion, and more particularly to a device for sensing and indicating the pressure within a food extruder.

The advent of high output food extruders, capable of cooking and expanding proteinaceous and farinaceous materials, proved a boon to pet food and cereal manufacturers. However, sensing pressure within these devices has been complicated by the fact that there has to this date been no reliable device capable of sensing the pressure within an extruder operating on a continuous basis over extended periods of time. The devices which have been known are susceptible to caking and embedding with the farinaceous and proteinaceous materials being extruded. Because of this, scientific studies designed to deduce the variation of product qualities and processing efficiencies as function of process pressure, have been difficult to impossible to run.

Pressure sensing devices known for use in plastics extruders have not been successful when applied to food extruders because of the different nature of the materials being plasticized. Fouling of the pressure sensors in plastics extruders is minimal due to the thermoplastic nature of the materials involved. Thus, in a plastics extrusion situation, the thermoplastic material will be in a constant state of melt and will not cool down to set up within the extruder. In the food extruder, on the other hand, the proteinaceous and farinaceous materials pass through a thermoplastic state into a thermosetting state where they tend to coagulate and heat set.

There is a present need for a system which would enable measuring pressure within the extruder barrel on a continuous basis. The nature of the food material is such that a simple Bourdon tube gage cannot be used because the opening to the internal oval tube is quickly plugged by the food material being processed. Moreover, differential pressure instruments utilizing diaphrams cannot be employed because of the heat-setting character of the food material at high temperature which tends to cause it to cake on the diaphram, rendering it insensitive. Thus, what is needed is a pressure sensing and measuring device which is insensitive to caking of the food material being extruded.

SUMMARY OF THE INVENTION

The present invention provides a device for sensing and indicating the pressure within a food extruder. The device comprises: (a) a source of pressurized fluid; (b) a conduit connecting the source of pressurized fluid with the interior of an extruder; (c) means operatively engaged with the conduit for measuring the flow of fluid therethrough; (d) means responsive to the measured flow rate for controlling the flow of the fluid through the conduit to maintain a positive flow within a predetermined fixed range; and (e) pressure sensing means operatively engaged with the conduit for sensing the pressure within the conduit at a location between the means for measuring flow of fluid and the food extruder, said pressure sensing means being calibrated to indicate the internal extruder pressure.

BRIEF DESCRIPTION OF THE DRAWINGS

The invention will become more apparent when viewed in light of the detailed description which follows, especially when read in view of the attached drawing wherein:

The FIGURE shows a schematic representation of a device according to the present invention for sensing the pressure within a food extruder.

DETAILED DESCRIPTION OF THE INVENTION

The preferred embodiment of the present invention will be described with specific reference to a food extruder for preparing a dry, expanded pet food, using air as the pressure balancing fluid for purposes of example only. It is to be understood, however, that the device can be employed on any of the known food extrusion devices which develop significant internal pressures.

The high pressure devices for extrusion of expanded pet foods, snack foods, or texturized protein products, and the like, are particularly in need of a pressure sensing device of the type herein disclosed because of the variabilities which can occur during processing due to normally occuring raw material variability, as well as other anomalies which by their very nature cause pressure changes in the process. These pressure changes, if noted, could be controlled by automatic or manual means to assure product quality control. However, where the changes go unnoticed, until a later processing step, severe product problems may have been introduced which can be corrected for only by costly procedures which may involve overpacking or scrapping an entire production run.

According to the particular embodiment shown in the FIGURE, extruder 2 is a screw-fed extruder having a screw 4 internally of the extruder barrel 5. The extruder is heated by jacket 6 which can be supplied by steam, hot water or other heat transfer medium as is desired. The screw is powered within the extruder by electric motor 8, which may be engaged with the screw through a set of transmission gears or the like. The raw materials to be processed within the extruder are fed thereto via hopper 10, and forced from the feed end of the extruder near the hopper by screw 4 to the die end of the extruder which is fitted with die plate 12 having a plurality of orifices 14 therein.

The device of the present invention can be employed to sense the pressure at any point within the extruder barrel; however, it is preferred to obtain the pressure reading in the last stage of extrusion, such as shortly before the die plate 12 as shown in the FIGURE. To accomplish this, conduit 16, having an opening into the extruder at 18, feeds air or other fluid into the extruder at a predetermined flow rate which is controlled by flow controller 20 through control valve 22 which, according to the preferred embodiment as shown in the drawings, is a normally open valve. The controller operates by sensing the flow through the conduit 16 by flow sensor 24 and transmitting that flow rate to the controller by means of transmitter 26 and associated lines 28.

Flow sensor 24 can be any of the known devices, such as an orifice plate. Likewise, the transmitter 26, controller 20 and control valve 22 will be of conventional construction and function. The control valve can be a normally open or a normally closed type, and the instrumentation can be pneumatic, electronic, or any combination of these; the uniqueness of this invention not being in the instrumentation itself but in the concept and the overall application of it to the continuous monitoring of the pressure in a food extruder.

The fluid supply for the conduit 16, in this particular example, is air held in supply tank 30 which is maintained at a constant predetermined pressure by means of compressor 32 or other suitable equipment alone or in combination with such a compressor. The device should also contain a check valve as indicated at 34 to prevent the possibility that a sudden surge in pressure in the extruder would cause a backflow of material into the pressure sensing device.

A pressure sensing means, 36 operatively engaged with the conduit, for sensing the pressure within the conduit is provided at a location between the food extruder 2 and the means 24 for measuring the fluid pressure. This pressure sensing means 36 can be a simple Bourdon tube gage, which is calibrated appropriately to read the pressure interior of the extruder barrel without the need for bringing it into contact directly with the material being processed. The Bourdon tube, in fact, measures only the pressure flowing through the conduit 16 just before the extruder.

It is possible by means of a simple calibration at some known conditions to establish the relationship between the pressure within the conduit ($P_c$) and the pressure within the extruder barrel ($P_e$), because the pressure within the conduit is a function of the pressure within the extruder. Stated another way, where the fluid source 30 is provided at a constant, known pressure ($P_s$) and the pressure ($P_e$) within the conduit 16 is known by virtue of pressure sensing means 36, then the pressure ($P_e$) within the extruder 2 must be determinable taking into account those factors, such as compressibility and temperature, which might affect the pressure measurement.

The control valve 22 shown in the illustration is normally open and the tendency is for the fluid from the source at a higher pressure to flow into the extruder at lower pressure. The rate of total air flow $Q_t$ (assuming laminar flow), from the source 30 to the extruder 2, is proportional to the pressure difference existing between these two elements, or $$Q_t = K_1(P_s - P_e)$$

where, $K_1$ is a known dimensional constant. Similarly, the flow rate across the control valve 22 and the flow sensor 24 is given by $$Q_c = K_2(P_s - P_c)$$

where $K_2$ is a dimensional constant.

Now, if the flow controller 20 is used to control the air flow at a constant rate, then, $$K_1(P_s - P_e) = K_2(P_s - P_c)$$

or, $$P_e = P_s - K_2/K_1(P_s - P_c)$$

Hence, by means of a simple calibration at some standard conditions, the relatinship between $P_c$ and $P_e$ can be established for the given process. From thereon, through the continuous monitoring of $P_c$, the process pressure $P_e$ can be determined at any time.

The schematic representation shown in the drawings is only one of the many variations possible in the application of the direct-balanced pressure sensing system of this invention. Included in the possible variations are the use of a control fluid which can be a gas other than air, a liquid, or even flowable solids such as the dries employed in pet food manufacture or appropriately sized and shaped pellets. The fluid can be a substance foreign to the process ingredients or it can be one of them. Depending upon the accuracy of the flow sensor 24 and associated control mechanisms employed, the flow rate can be controlled within any desired predetermined range from a trickle to relatively high flow rates. The flow rate can be fixed and the required balancing pressure in the conduit $P_c$ can be employed as a measure of the process pressure in the extruder $P_e$, or the varying flow rate itself for a fixed supply pressure can be employed as a measure of the varying extruder process pressure $P_e$.

The pressure sensing device of this invention must be employed with the knowledge that the very act of attempting to determine the process pressure by counterbalancing it with a higher pressure has an impact on the process itself, and a correction factor must be incorporated into the process designed for accuracy. Obviously, the impact will be greater in the case of a more static process system than it would be in the highly dynamic case of a food extruder operating at high volume outputs in accordance with the preferred embodiment. Where the flow sensor and controller are accurate and well calibrated units, the addition of the fluid into the process stream can be used to advantage, as in the case of air injection into the process where it can be employed to actually increase the degree of expansion while maintaining low process water rates consistent with economic operation and subsequent low energy inputs for drying.

The following example is presented for the purpose of further illustrating and explaining the present invention and is not to be taken as limiting in any regard. Unless otherwise indicated, all parts and percentages are by weight.

EXAMPLE

In the specific example of making a dry expanded pet food, generally in accordance with the process of Example I of the Ludington et al U.S. Pat. No. 3,119,691, the formulation therein set forth is fed to a 4¼ inch diameter Anderson expander which operates at a throughput of about 400 lbs. per minute. The incoming raw materials have a moisture content of about 10%, are moistened with water and steam, and are extruded at a final moisture content of about 26% based on the weight of the total formulation. The Anderson expander has a number of breaker bolts inserted within the barrel at positions spaced along its longitudinal extent from the feed end to the die end (shown in the FIGURE). The breaker bolt closest to the die plate is replaced with a fitting having a fluid holding conduit in communication therewith. The conduit is connected to a source of air pressure maintained at a constant pressure of 400 psig. The conduit passes from the source to the interior of the extruder interrupted only by a control valve, a flow sensing device, a check valve, and a Bourdon tube pressure gage. The flow sensor is coupled operatively with a flow controller which controls the amount of fluid which will pass through the conduit within a predetermined set level of about 0.01 actual cubic feet per minute (ACFM). This minor amount of fluid does not markedly affect the overall product characteristics. The extruder is found to operate at a pressure of 95 psig by the use of a Bourdon tube gage which registers the pressure before it becomes clogged with the food material in the extruder. The temperature in the extruder is within the range of from about 170° to about 225° F. Under these conditions, the values of $K_1$ and $K_2$ are calculated to be 0.01/305 and 0.01/298 ACFM/psig, respectively. This calculation is made as follows:

0.01 ACFM = $K_1$(400 psig—95 psig) or $K_1$ = 0.01/305 ACFM/psig 0.01 ACFM = $K_2$(400 psig—102 psig) or $K_2$ = 0.01/298 ACFM/psig By reading the pressure from the Bourdon tube pressure gage, and calculating according to the equation, $$P_e = P_s - K_2/K_1 (P_s - P_c)$$

or, $$P_e = 400 - 305/298(400 - P_c)$$

Thus, the pressure is easily calculable, and in the case where a $P_c$ value of 100 is read, the particular calculation in this instance indicates $P_e$ to be about 93 psig.

By knowing this value for the pressure within the barrel of the extruder, it is now possible to more accurately control the final product quality in terms of the extruder conditions and the raw materials fed thereto.

The above description has been for the purpose of teaching those skilled in the art how to practice the invention. It has not been presented for the purpose of teaching all those obvious modifications and variations of the invention which would become apparent to the person of ordinary skill in the art upon reading the above description. It is intended, however, that all such obvious modifications and variations be included within the scope of the invention which is defined by the following claims.

What is claimed is:

1. A pressure sensing device for continuously measuring the pressure within the barrel of a food extruder operating under pressure which comprises:
    (a) a source of pressurized fluid;
    (b) a conduit connecting said source of pressurized fluid with the interior of the extruder barrel;
    (c) means operatively engaged with said conduit for measuring the flow of fluid therethrough;
    (d) means responsive to the measured flow rate for controlling the flow of fluid through the conduit to maintain a positive flow within a predetermined fixed range;
    (e) pressure sensing means operatively engaged with said conduit for sensing the pressure within the conduit at a location between the means for measuring flow of fluid and the food extruder, said pressure sensing means being calibrated to indicate the internal extruder pressure; and
    (f) a check valve in the conduit between the means operatively engaged with said conduit for measuring the flow and the extruder to prevent the possibility that a sudden surge in pressure in the extruder would cause a backflow of material into the pressure sensing means.

* * * * *